F. E. JOHNSON.
COTTON PICKER.
APPLICATION FILED FEB. 9, 1918.

1,300,276.

Patented Apr. 15, 1919.
3 SHEETS—SHEET 1.

Inventor
F. E. Johnson

By E. H. Colladay
Attorney

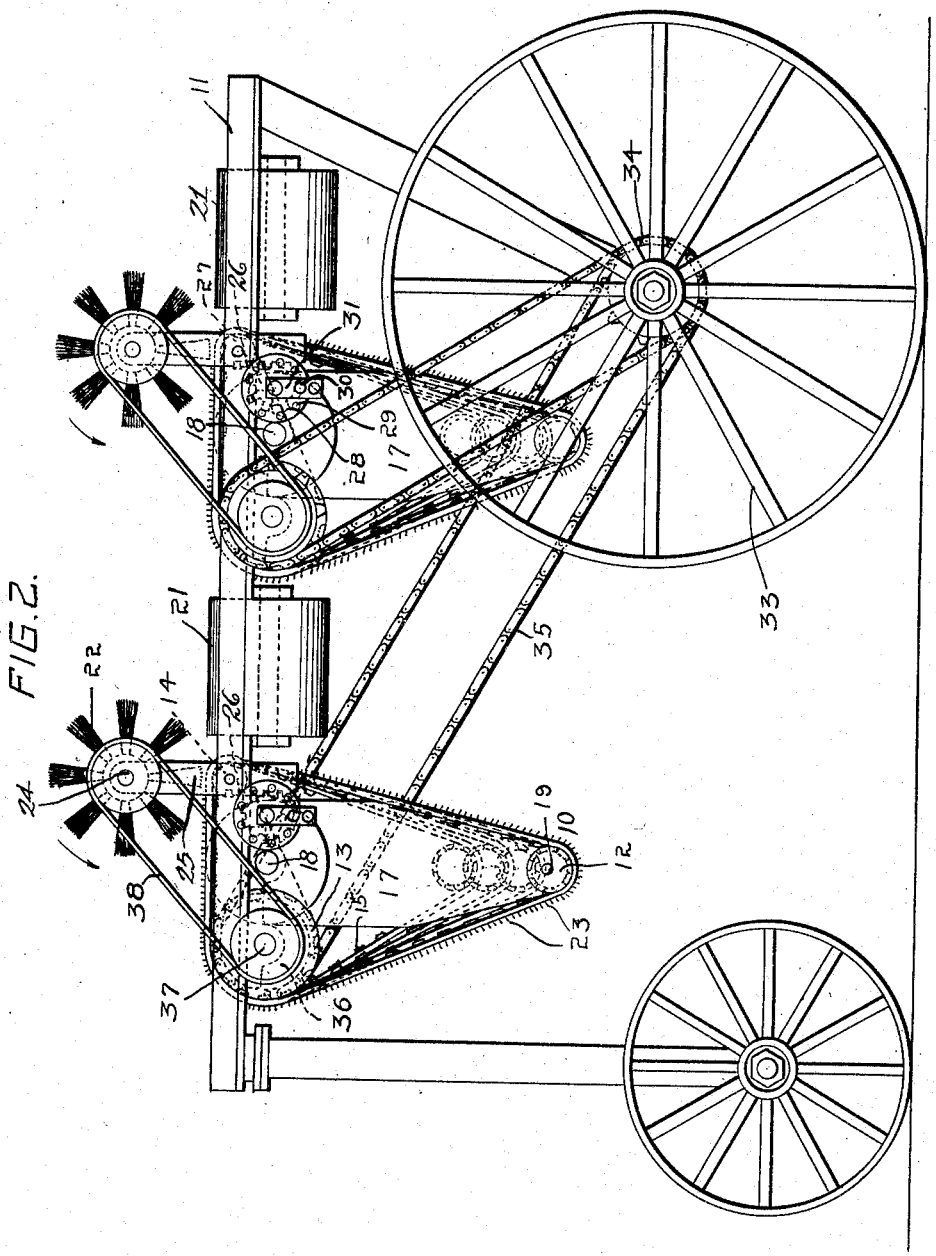

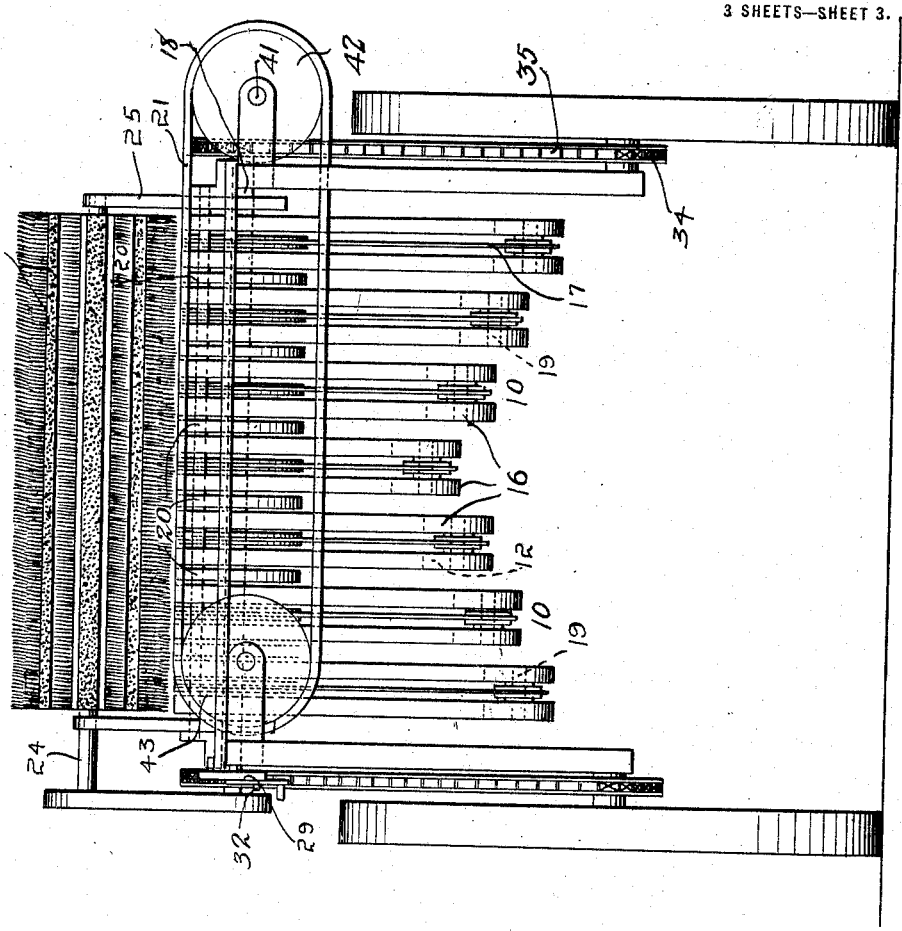

UNITED STATES PATENT OFFICE.

FRANK EDWARD JOHNSON, OF DALLAS, TEXAS.

COTTON-PICKER.

1,300,276.　　　Specification of Letters Patent.　　Patented Apr. 15, 1919.

Application filed February 9, 1918. Serial No. 216,218.

*To all whom it may concern:*

Be it known that I, FRANK E. JOHNSON, a citizen of the United States of America, residing at Dallas, in the county of Dallas, State of Texas, have invented certain Improvements in Cotton-Pickers, of which the following is a description, reference being had to the accompanying drawings, forming a part thereof.

The object of the invention is to provide a cotton picking or harvesting mechanism having means for effecting the removal of the cotton from the bolls so as to insure a maximum yield, without injury to the plants and therefore with the minimum contamination of the cotton by waste or foreign matter such as portions of the plants.

To this end the invention contemplates, in its preferred embodiment, a plurality of independently progressive, endless picker-elements, so arranged, supported and operated as to permit the same to yield and swing longitudinally of the machine, so that while each element is held in position to act upon the cotton bearing portions of the plant, it is adapted to yield more or less as may be necessary, due to obstacles provided by the plant, to thereby avoid the disadvantages which are incident to machines in which the picker-elements have rigid or transversely fixed paths and hence are relatively inoperative or impractical when used in connection with a crop in which the plants or stands vary considerably in height or in the extent to which the branches spread.

It is also an object of the invention to provide a picker in which the yielding elements which actually engage the cotton to remove it from the bolls are capable, without manipulation by the operator, of disposing themselves, separately and independently in contact with a plant regardless of peculiarities of the latter.

Further objects and advantages of the invention will appear in the course of the following description, considered in reference to the accompanying drawings, it being understood, however, that numerous changes in form, proportions and details of construction and arrangement, may be resorted to, within the scope of the appended claims, without departing from the spirit of the invention.

In the drawings:

Fig. 2 is a side elevation of the same.

Fig. 3 is a rear view.

Fig. 4 and Fig. 5 are respectively side and edge views of one of the floating division plates.

Fig. 6 is a detail sectional view showing one form of adjusting and locking means for the brackets or standards which support the brush employed to strip the cotton from the picker members and deposit the cotton upon the cross conveyer by which it may be delivered into a suitable receptacle (not shown).

Figure 1:
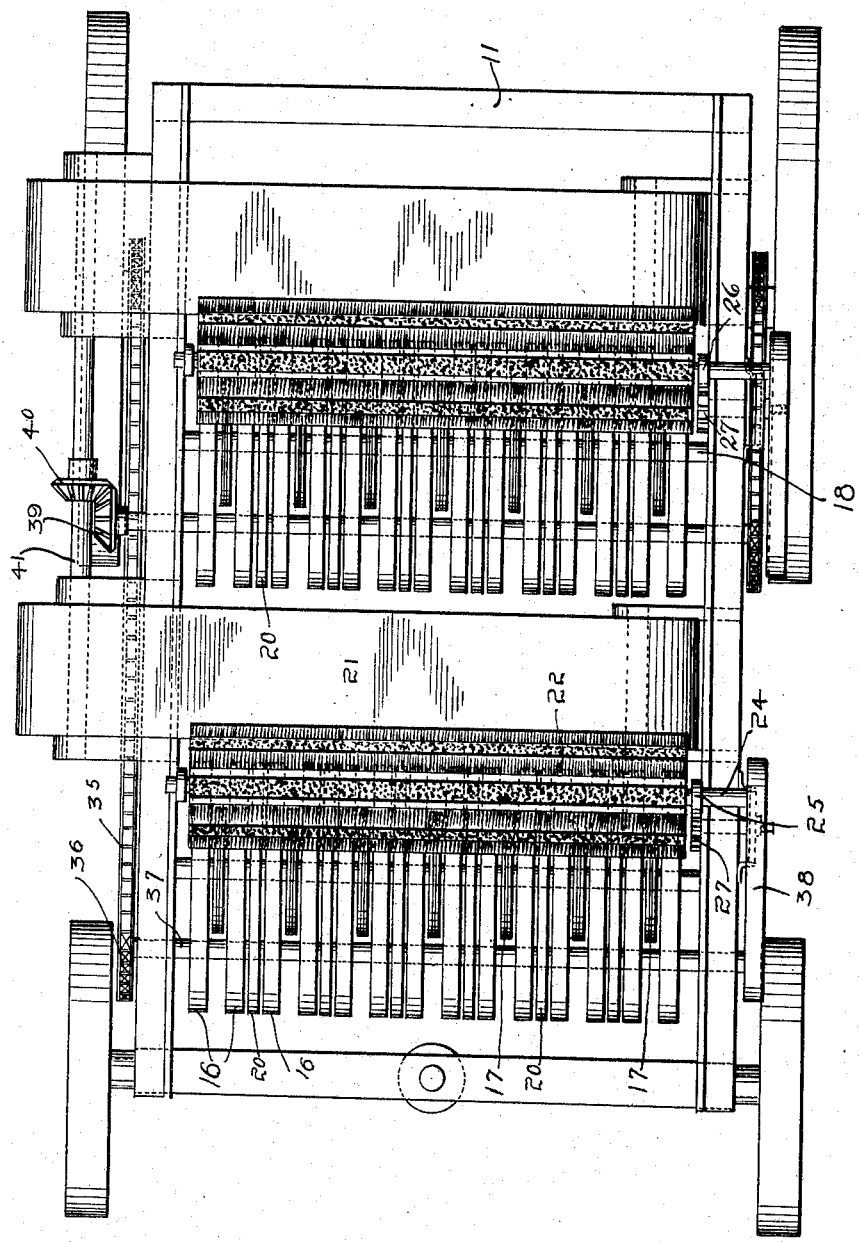
Figure 1 is a plan view of a machine embodying the essential features of the invention.

The essential feature of the mechanism resides in the picker proper, which is of both transverse and longitudinal flexibility to adapt it to conform to the shapes and sizes of the cotton plants and suitably contact with the cotton bolls without breaking the limbs of the plant or involving injury to the apparatus, and it consists of a plurality of picker members 10, disposed in a series transversely of the machine, said members preferably being of graduated lengths as shown clearly in Fig. 3, those at each end of the series being of the greatest length with the intermediate members progressively shorter toward the center or intermediate point of the series. Also each picker member is of endless construction, and between its points of support on the movable truck or carriage 11 of the machine (which is portable and may be of the wheeled or any other preferred type) is disposed to form a pendent or pendulous loop or bight, as shown clearly in Fig. 2, this bight or intermediate portion of the member preferably being weighted as shown at 12 to insure the proper yielding contact of the member with the plants. In the construction illustrated the supports for the picker member consist of rolls, disks or similar revoluble elements 13 and 14, the former preferably consisting of a sprocket for engagement with and adapted to impart longitudinal progressive movement to the picker member through the agency of projections 15 or the equivalent on the latter. The other supporting member may, as shown, consist of an idler.

Each picker member preferably consists, essentially, of one or more flexible endless picker-elements 16. In the drawing each member consists of two picker-elements disposed side by side in parallelism, and between said elements there is arranged a pendulum plate 17 mounted for swinging movement at or near its upper end upon any suitable transverse support such as the spindle or rod 18 and provided at the lower end with a bearing for the spindle 19 of the weight 12 when the latter, as shown, is of the rotary type and is seated in the loop or bight of the picker member to maintain the latter in an efficient rounded form regardless of contact with obstacles in the path thereof. The rotary weight elements are also preferably provided with sockets to receive the projections on the inner surfaces of the picker-elements, so as to turn during the progress of said elements. Also between each two picker members there is located a spacing plate 20 extending approximately parallel at its upper edge with the substantially horizontal upper flights of the picker members, while, disposed for movement transversely of the machine or truck, is a conveyer 21 upon which the cotton lint is deposited by a rotary brush 22 which serves to detach the cotton from the endless picker members, the elements of which should have a suitably roughened surface as by providing the same with short spurs or projections as indicated in the drawing at 23. The brush is preferably provided with a spindle or shaft 24 mounted in bearings formed in brackets 25 which, in order to provide for adjustment of the brush relative to the picker members and conveyer are provided with racks 26 engaged by pinions 27. Any suitable locking means may be provided to hold the parts at the desired adjustment such as a disk 28 carried by the spindle of the pinion and having openings 29 for alinement with a similar opening 30 in any suitable fixed part of the frame such as bracket 31, whereby a pin 32 may be inserted into the registering openings in the disk and said bracket.

The mechanism is preferably driven from a rotary supporting element of the machine such as the wheel 33 having, for example, a sprocket wheel 34 traversed by a chain 35 which also engages a sprocket wheel 36 on the shaft 37 of the rotary carrying elements 13 of the picker members, while the brush may receive motion from the same shaft through a belt 38 or the equivalent thereof. The conveyer may also, as shown, be driven from the shaft 37 through intermeshing beveled gears 39 and 40 and the spindle 41 of a carrier roll 42 supporting one end of the conveyer belt 21, the corresponding roller of said conveyer belt as shown at 43, being an idler.

While in the foregoing description reference has been made to the one picker or set of picker members and related parts, including the conveyer brush and means for operating the same, it will be understood that said parts may be duplicated or multiplied in number to the desired extent as may be found desirable in practice, two complete sets being illustrated in the drawings, as will be apparent by reference particularly to Figs. 1 and 2, and, as the two sets are counterparts of each other, for convenience the same reference characters apply to the corresponding parts thereof. The only common element illustrated relates to the means for communicating motion to the conveyers, in that the shaft 41 is common to both conveyers which receive motion through the described gearing from the shaft 37 of one of the sets of picker members.

Particular attention is called to the fact that the construction of the picker proper, made up as described of a plurality of independently movable pendulous members, each comprising one or more longitudinally progressive endless picker elements, provides for a transverse flexibility of the picker as a whole and insures an effective hugging of the plants, without objectionable force of contact therewith, the members of the picker having substantially a floating action with reference to the plants, and each member performing its picking action due to the longitudinal progressive movement of the elements thereof, regardless of the position of the member controlled by the peculiarities of the plant. The results secured by such a construction of picker have been found in practice to involve a substantially complete removal of the cotton from the plant under conditions leading to high market grade of the product.

Having described the invention, what is claimed is:

1. A cotton picker including a pendulum suspended from its upper end, a traveling picker element arranged over and carried by the pendulum, and means for propelling the picker element.

2. A cotton picker including a wheeled frame carrying belt supporting means, a pendulum suspended from its upper end within the frame and carrying at its lower swinging end a belt holding and guiding device, an endless picker belt arranged over the belt supporting means on the frame and the belt holding and guiding device on the pendulum, and means for propelling said belt.

3. A cotton picker including a plurality of separate endless picker elements having cotton picking means thereon, means for mounting said picker elements to form a pendent non-collapsible loop, and means for causing the loop to swing longitudinally of the machine.

4. A cotton picker including a plurality of separate endless traveling picker elements having cotton picking means thereon, means for supporting said elements to form a pendent loop, and a weight arranged in the lower end of the loop to place the picker element under tension.

5. A cotton picker including a plurality of separate endless traveling picker elements having cotton picking means thereon, means for mounting said elements to provide a pendent loop, and a rotatable weight maintained in the lower end of the loop.

6. A cotton picker including a plurality of separate endless traveling picker elements having cotton picking means thereon, means for supporting said endless picker elements, a weight arranged in the lower end of the loop formed by the picker element and a pendent plate having its lower end engaging the weight to maintain the same in operative relation with the picker element as the latter swings longitudinally of the machine.

7. A cotton picker including a frame, a plurality of separate endless traveling picker belts having cotton picking means thereon, means mounted in said frame for supporting said belts whereby the same form pendent loops, a weight in the lower end of said loops and engaged with the belt to rotate therewith, and a plate for each loop having its lower end engaging said weight and its upper end mounted on an axis disposed transversely of the picker frame.

8. A cotton picking machine including a wheeled frame carrying a plurality of picker units, each unit consisting of a plurality of separate endless picker belts having cotton picking means thereon, and means for placing each belt under tension.

9. A cotton picking machine including a frame, a plurality of picking units carried by said frame, and each unit including a transversely arranged series of endless belts having cotton picking means thereon, and means swingingly suspended from said frame and having its lower end engaging the lower portions of the loops formed by said belts whereby the latter are maintained in perpendicular position and are adapted to have an oscillating movement parallel to the longitudinal axis of the machine.

10. A cotton picking machine including a plurality of separate endless picker elements having cotton picking means thereon and mounted to form pendent loops of graduated length.

11. A cotton picking machine including a plurality of separate endless picker elements thereon and mounted to form pendent loops progressively decreasing in length toward the longitudinal center of the machine.

12. A cotton picking machine including a wheeled frame having a plurality of independently operating picking units thereon, each unit consisting of a plurality of separate juxtaposed endless picker belts having cotton picking means thereon and mounted to form pendent loops which progressively decrease in length toward the longitudinal center of the frame, and means for placing each of said belts under tension and causing the same to yield in a perpendicular plane parallel to the longitudinal axis of the frame.

13. A cotton picking machine including a wheeled frame, a plurality of cotton picking units carried by said frame, each unit including a plurality of separate independently operating tensioned looped belts having cotton picking means thereon, and a conveyer arranged transversely of the frame adjacent the upper end of the said belts, and means for removing the cotton from the cotton picking means of said belts and depositing the same on said transverse conveyer belts.

This specification signed and witnessed this ninth day of November, 1917.

FRANK EDWARD JOHNSON.

Witnesses:
F. W. BARTLETT,
G. M. KNAPP.

Copies of this patent may be obtained for five cents each, by addressing the "Commissioner of Patents, Washington, D. C."